United States Patent [19]
Zimmerly

[11] Patent Number: 5,469,880
[45] Date of Patent: Nov. 28, 1995

[54] MANIFOLD VALVE ASSEMBLIES WITH CLEANING SOLUTION SUPPLY

[75] Inventor: Robert D. Zimmerly, Kenosha, Wis.

[73] Assignee: Tetra Laval Holdings & Finance, S.C., Pully, Switzerland

[21] Appl. No.: 357,464

[22] Filed: Dec. 16, 1994

[51] Int. Cl.⁶ ................................................. F16K 11/20
[52] U.S. Cl. ....................... 137/240; 137/597; 137/637.2
[58] Field of Search ................................... 137/240, 597, 137/637.2

[56] References Cited

U.S. PATENT DOCUMENTS

| | | | |
|---|---|---|---|
| 2,500,239 | 3/1950 | Beyette | 137/597 |
| 4,444,215 | 4/1984 | Zukausky | 137/597 X |
| 4,757,834 | 7/1988 | Mieth | 137/240 X |
| 4,856,551 | 8/1989 | Bräkelmann | 137/637.2 X |
| 4,967,794 | 11/1990 | Tsutsui et al. | 137/597 |
| 5,048,563 | 9/1991 | Buchanan et al. | 137/597 |
| 5,232,023 | 8/1993 | Zimmerly | 137/240 X |
| 5,275,201 | 1/1994 | Zimmerly | 137/454.6 |
| 5,390,694 | 2/1995 | Zimmerly et al. | 137/597 X |

FOREIGN PATENT DOCUMENTS

| | | |
|---|---|---|
| 1163622 | 2/1964 | Germany . |
| 2233388 | 1/1974 | Germany . |
| 56-49473 | 5/1979 | Japan . |

OTHER PUBLICATIONS

Tri Clover, Inc. Product brochure entitled "Tri-Flo Mix-Proof Valves" dated Sep. 1993.

*Primary Examiner*—Stephen M. Hepperle
*Attorney, Agent, or Firm*—Ryan, Maki & Hohenfeldt

[57] ABSTRACT

A plurality of manifold valve assemblies each including pairs of generally vertical valve cylinders each cylinder having actuator rods that are coaxial with each other, the rods being independently actuatable by their respective actuators. Each cylinder has an inlet port at its top each connected to a different supply conduit and each being connected by a crossover conduit near its lower end to the lower end of the other cylinder of the pair. One of the bottom ports of each pair is connected to a drain, thereby forming a leak detector, while the other bottom port of each pair is connected to a line supplying a clean-in-place liquid. Valve seat 45 is positioned below valve plug 40 so that it is closed by extension of actuator rod 32.

4 Claims, 4 Drawing Sheets

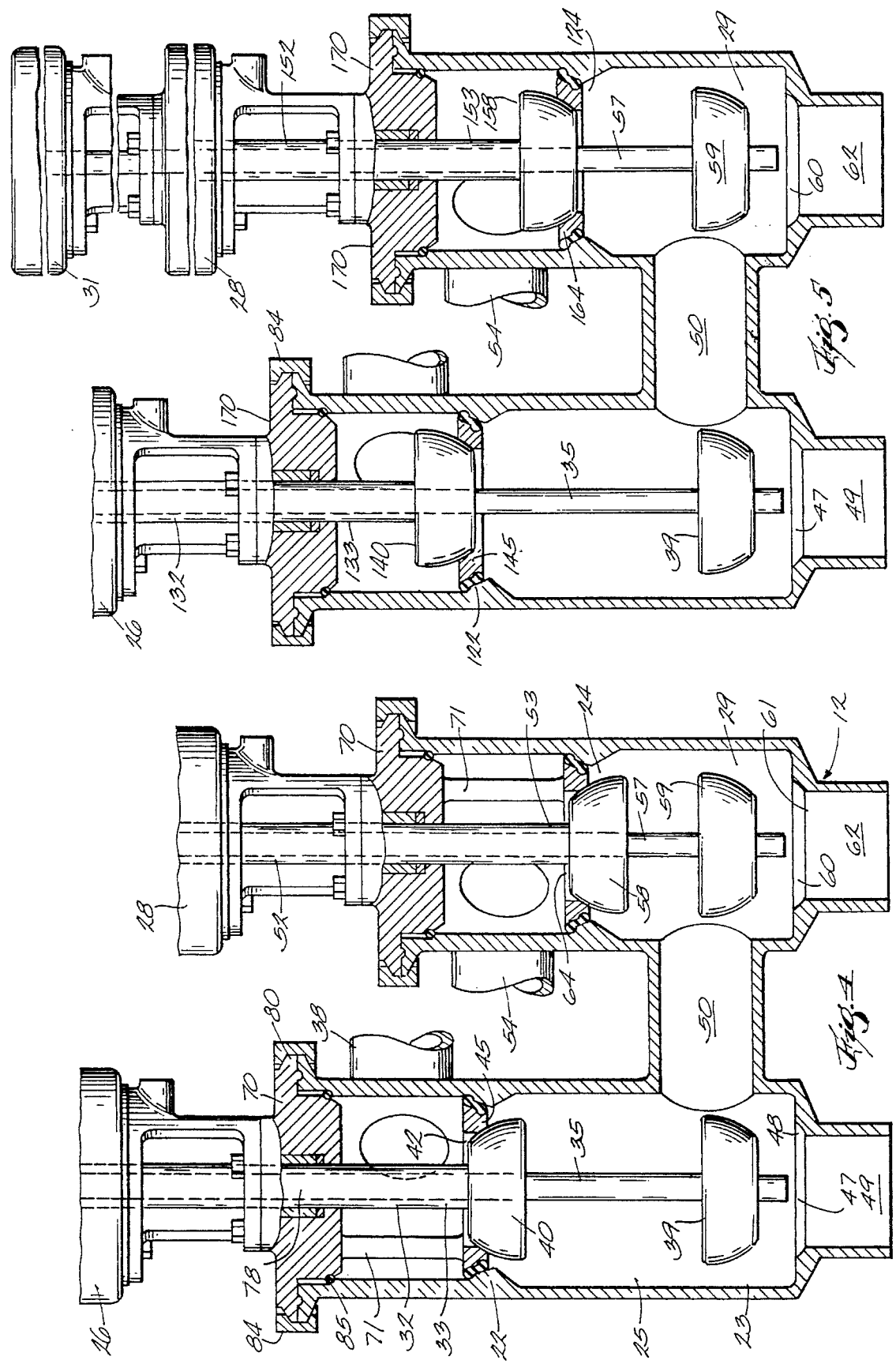

MANIFOLD VALVE ASSEMBLIES WITH CLEANING SOLUTION SUPPLY

BACKGROUND OF THE INVENTION

This invention relates to valves for controlling the flow of fluids, and particularly to block-and-bleed valves assembled together to form manifolds for controlling the flow of fluids, especially liquid foods or beverages, from multiple sources to multiple delivery destinations. The invention represents a further modification and improvement of the manifold systems disclosed in my U.S. patent application Ser. No. 5,232,023, issued Aug. 3, 1993.

It is common in the food packaging industry to have a need to connect a number of sources of a fluid, such as different types of milk or different types of soft drinks, to a number of different filler machines to fill containers, such as gallons, half-gallons, quarts and so on. To date, these connections have been accomplished in the form of a manifold, including a number of lines from the source tanks crossing a number of lines leading to the filler machines, with valves being provided to control flow of fluid from any selected one or more of the source tanks to any chosen one or more of the filler machines.

In the past, it was conventional to use specially designed valves to control these manifolds, called block-and-bleed valves, sometimes called leak detector valves, with one such valve installed at each manifold intersection. Block-and-bleed valves are particularly applicable to the sanitary industry, because they permit control of flow of different types of fluids through the same valve with double protection against intermixing of those fluids. That is, it may be desirable to have chocolate milk flowing through one part of the valve and white milk through another part, or pasteurized milk through one part and raw milk through another part, or clean-in-place solution through one part and milk or another food fluid through another part. Clearly, it is critical that these fluids not be permitted to mix, and regulations require that even failure of a single seat or valve plug not permit such mixing.

While valves used in the past functioned generally satisfactorily, they were extremely complex and expensive, and included multiple, coaxial, independently operable actuators and valve plugs. Under certain circumstances these valves were subject to substantial leakage and product waste, and when they did fail in this manner, while preventing mix of different fluids, their maintenance was difficult and expensive.

Even the improved systems heretofore devised have suffered from the limitation that, if a fluid flow line is dedicated to supplying cleaning or sanitizing solutions, only a single product can be supplied at any given time. A need has, thus, continued to exist for improved valve assemblies that are economical, readily controlled, minimize waste of the fluids being conveyed, and permit the simultaneous flow in segregated portions of the system, simultaneously, of cleaning solution and more than one product.

In my above-noted patent there was shown a manifold valve assembly, that enables the use of three individually controllable valves to control the flow of fluids at each intersection in a manifold and in which each intersection is configured so that substantially all of the fluid can be drained by gravity flow prior to opening of the drain or leak detector port. In that assembly two of valves are combined in a single valve housing and use independently controllable coaxial actuators while a third valve is connected thereto by a short connecting conduit configured so that liquid will drain by gravity from the first two valves through the third to the delivery conduits. Independent control of a drain port that serves as a leak detector was provided for. Concentrically configured or coaxial actuator rods were used to enable independent control by means of simple actuators that are linearly aligned with each other. Both actuators and valve assemblies are readily removable as a single assembly for repair or replacement.

SUMMARY OF THE INVENTION

Briefly summarized, the invention provides a plurality of manifold valve assemblies each including pairs of valve cylinders, each cylinder having actuator rods that are coaxial with each other, the rods being independently actuatable by their respective actuators. Each cylinder has an inlet port at its top, each connected to a different supply conduit, and each being connected by a crossover conduit near its lower end to the lower end of the other cylinder of the pair. One of the bottom ports of each pair is connected to a drain, thereby forming a leak detector while the other bottom port of each pair is connected to a line supplying a clean in place liquid.

If desired, optionally, the valves which have rods that are coaxial with each other may both close in the same direction, downwardly, so that no valve cage or bonnet is required or alternatively, such a bonnet or valve cage may be used.

The outlet ports are configured so that liquids will drain by gravity from the lower end of the cylinder into the drain line from either valve cylinder of each pair either directly or through the crossover conduit, and each cylinder and connected supply or discharge conduit can be cleaned in place, either directly or through the crossover conduit.

An important advantage of the present invention relates to the provision of an economical valve assembly that provides a leak detector, or opening to the atmosphere, that complies with applicable regulations governing equipment used in the dairy industry and yet avoids spillage of milk each time the leak detector is opened. Provision is made for controllable separation of food processing circuits from cleaning circuits. In accordance with an important related aspect of the invention, cleaning of the valve assembly is facilitated by the fact that, unlike prior art valve assemblies, each valve in the assembly can be fully and adequately cleaned by virtue of the fact that each valve stem in the system can be fully extended and retracted for purposes of cleaning. This assures adequate cleaning of the valve parts and associated O-rings or similar seals. In accordance with a preferred embodiment of the invention, each pair of valves is carried on a bonnet that permits continuous flow through the pipes to which the assembly is connected and which enables the pair of valves and their actuators to be removed as a unit for service or repair. In accordance with an alternate embodiment each pair of valves is configured so that the two valves, which have rods that are coaxial with each other, both close in the same direction, downwardly, so that no valve cage on the valve bonnet is required.

Other objects and advantages of the invention will become apparent hereinafter.

BRIEF DESCRIPTION OF THE DRAWINGS

FIG. 4 is a fragmentary cross-sectional view of a valve assembly of the invention; and FIG. 5 is a fragmentary cross-sectional view showing an alternative embodiment of the alternative invention.

DETAILED DESCRIPTION OF THE DRAWINGS

Figure 1:
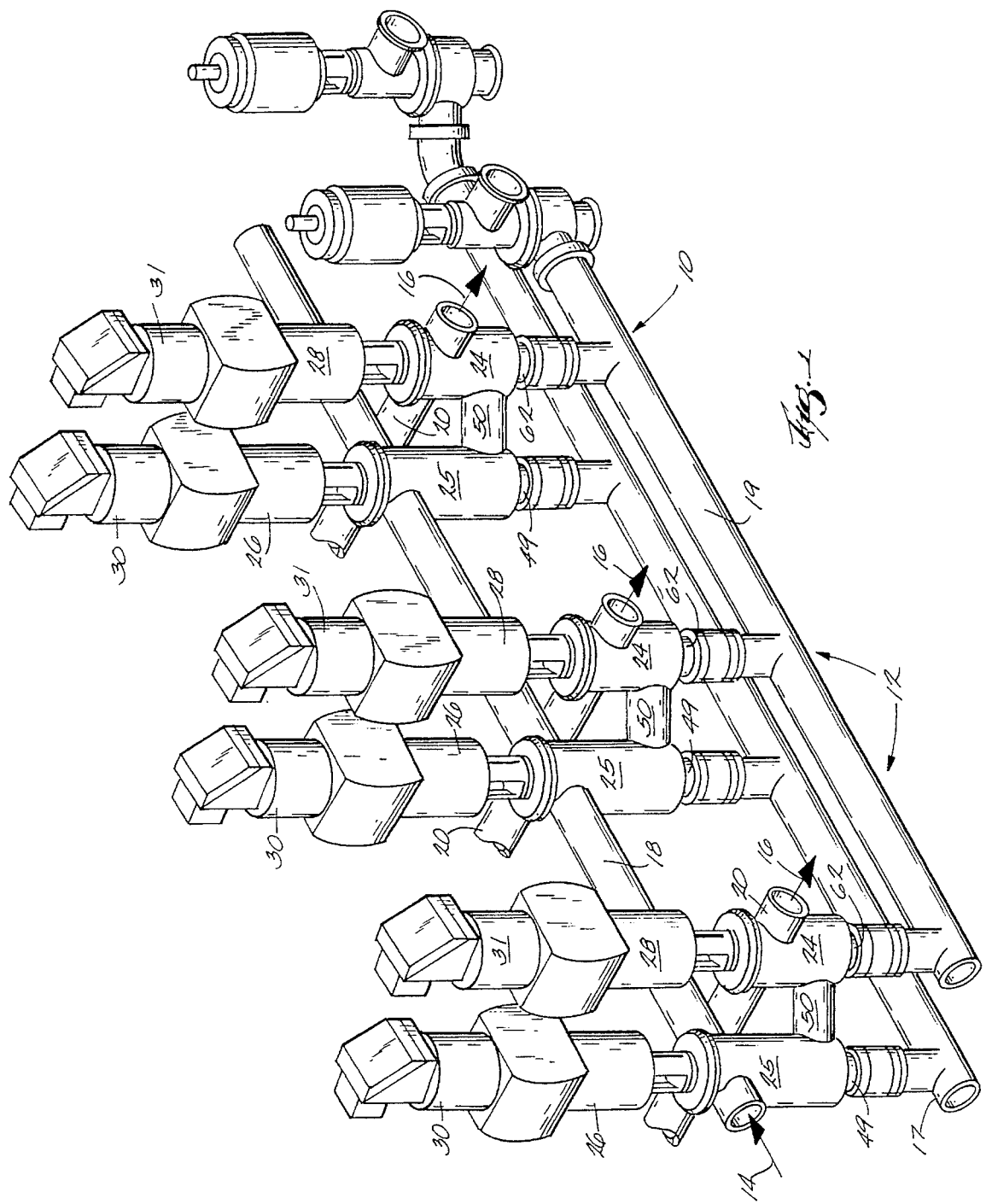
FIG. 1 is a perspective view of a section of a manifold assembly constructed in accordance with one embodiment of the invention.

Referring now to FIG. 1, there is shown a manifold assembly 10, employing a number of manifold valve assemblies 12 constructed according to one embodiment of the invention. As there are shown, the manifold assembly 10 is connected to and receives supply from a number of sources 14, such as tanks of fluid. The manifold assembly 10 is also connected to and supplies the fluid to a number of destinations 16, such as filler machines for filling containers with one or more of the fluids from the fluid supply tanks. The purpose of the manifold assembly 10 is to control and selectively permit the flow of fluid from one or more predetermined sources 14 to a predetermined destination 16. The manifold assembly includes one supply tube 18 for each fluid supply source 14, and one delivery tube 20 for destination 16. While the manifold assembly 10 shown in FIG. 1 is fragmentary (illustrating only one out of a number of supply tubes for illustrative purposes), it will be understood that the invention may be applied to any number of fluid supplies and destinations.

As can be seen from FIG. 1, this manifold assembly results in a crossed pattern of supply tubes 18 and delivery tubes 20. The supply tubes 18 and delivery tubes 20 do not actually intersect, but rather are positioned parallel in sets, in parallel planes, with the supply set being in the upper plane and the delivery set being in the lower plane. According to the embodiment of the invention shown in the drawings, the delivery tubes 20 are positioned in a plane beneath the plane of the supply tubes 18 so that fluids will tend to drain toward the delivery tubes by gravity flow. One manifold valve assembly 12 is provided at each crossing point of a supply tube 18 with a delivery tube 20.

The manifold assembly also includes a conduit 17 for providing a supply of clean-in-place solution. A drain line 19 is also provided for discharge of materials to a drain.

Figure 2:
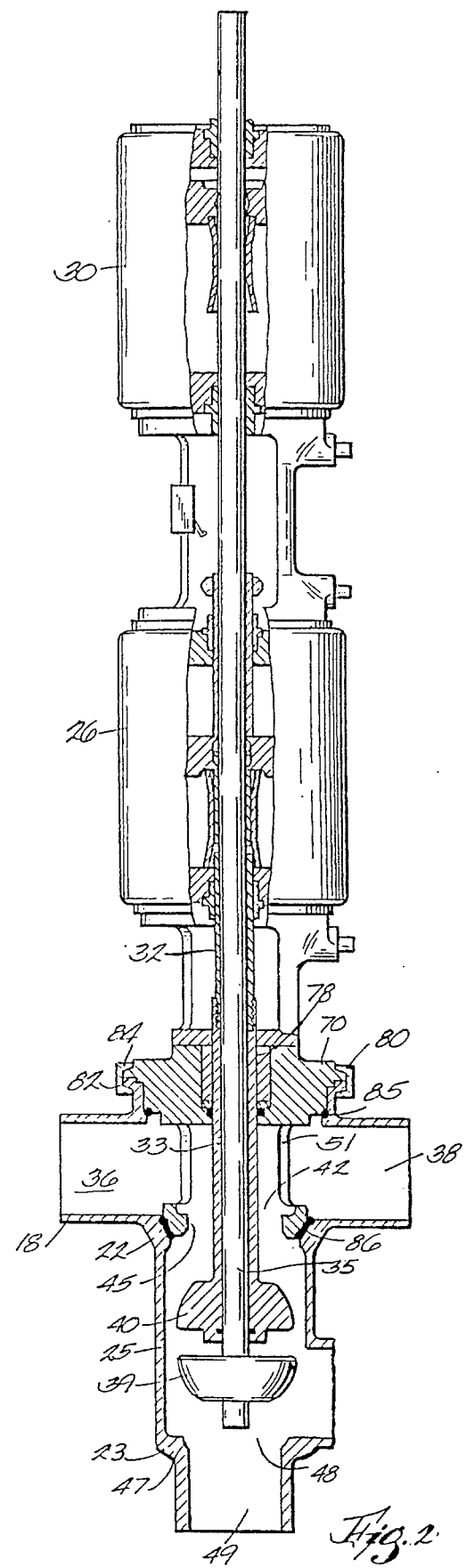
FIG. 2 is a side elevational view with parts in section showing both valves in the open position.
Figure 3:
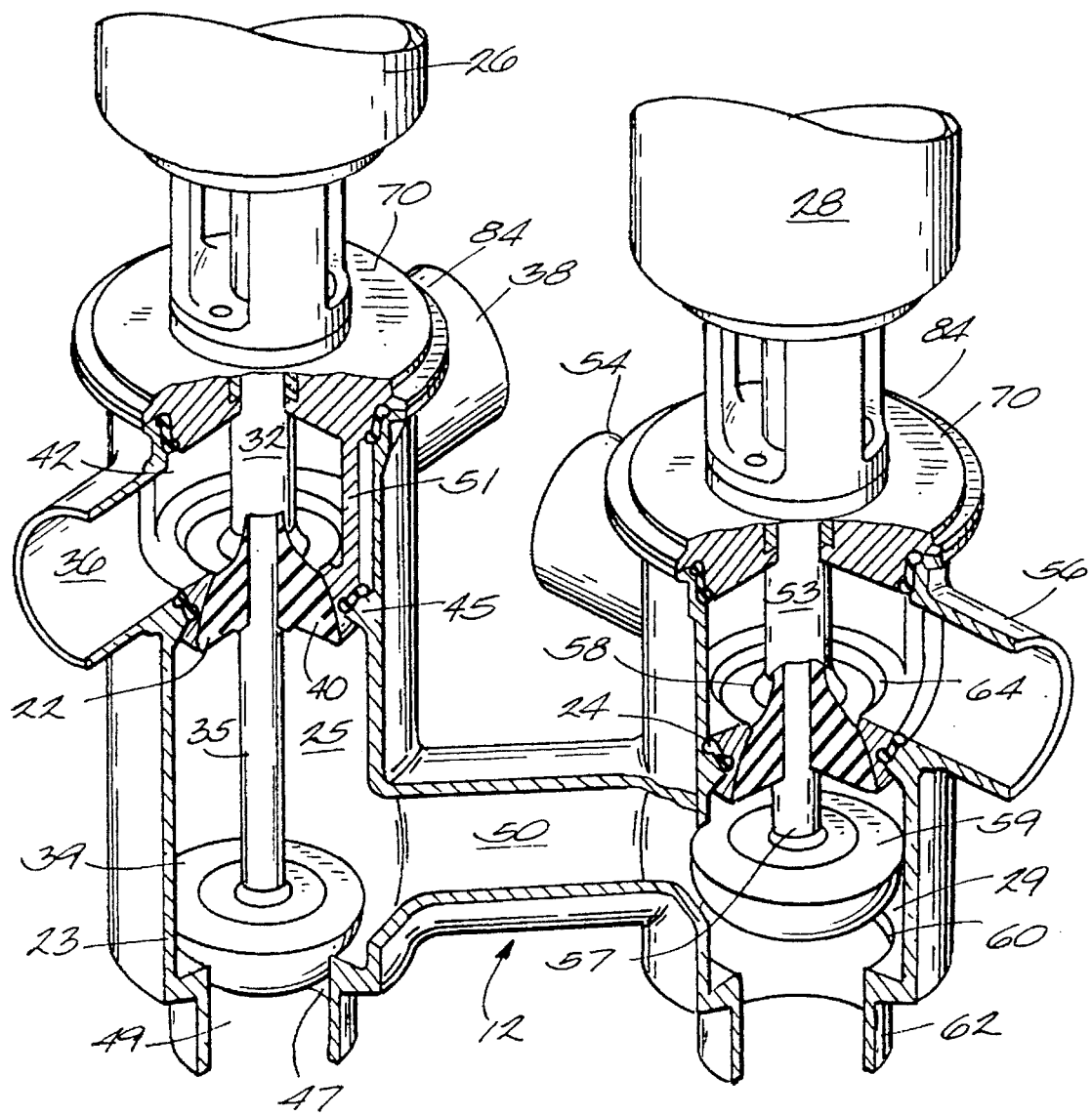
FIG. 3 is a perspective broken-away view of a single valve assembly with parts in section.

Each manifold valve assembly 12 includes in effect four separate valve bodies, a supply valve body 22 a delivery valve body 24, a cleaning solution supply valve body 23 connected to line 17 and a drain port or "leak detector" valve body 29 connected to drain line 19. In the arrangement of FIGS. 1–4, the valve bodies 22 and 23 are formed at opposite ends of a valve cylinder or housing 25. Each of these valve bodies 22, 23, 24 and 29 is supplied with its own actuator assembly 26, 28 and 30, 31, respectively. As shown in FIGS. 2–4, valve bodies 22 and 23 are interconnected and linearly aligned with each other as are valve bodies 24 and 29.

The interior detail of each valve body can be best seen by reference to FIGS. 2–4. Supply valve body 22 includes its own actuator 26, having a hollow annular actuator rod 32, actuatable between two positions, as shown. Valve body 22 has, at its top, a pass-through section including an inlet 36 substantially aligned with an outlet 38. Relating FIG. 2 with FIG. 1, the inlet 36 and outlet 38 of the supply valve body 22 connect to and in effect form part of one of the supply tubes 18, permitting flow of fluid from upstream destination valves at all times regardless of whether valve 22 is open or closed.

A valve plug 40 is attached to the end of valve stem 33 which is in turn attached to actuator rod 32. Plug 40 is provided to close a port 42 at the top of valve body 22. The perimeter of port 42 is defined by a valve seat 45. The actuator 26, thus, has two positions, one where port 42 is open and the other where port 42 is closed.

As seen in FIGS. 2–4, valve 23 is also a simple actuator type valve. Actuator 30 operates an actuator rod 35 which is connected by a valve stem to valve plug 39. Valve actuator rod 35 is located concentrically within stem 33. Valve plug 39 is adapted to fit into and close a valve seat 47 which defines a port 48 at the bottom of the housing of valve 23 so as to close a cleaning solution supply port 49 which is connected to cleaning solution supply conduit 17. Also, delivery valve body 24 has its own actuator 28 connected to an actuator rod 52, actuatable between two positions. Delivery valve body 24 has a pass-through section including an inlet 54 substantially aligned with an outlet 56. Relating FIG. 3 with FIG. 1, the inlet 54 and outlet 56 of the delivery valve body 24 connect to and in effect form part of one of the delivery tubes 20, permitting free flow of fluid to downstream delivery valves at all times regardless of the position of the valve 24. Valve body 25 is connected to valve body 29 by means of a crossover conduit 50.

Actuator rod 52 has affixed thereto a valve stem 53, by any suitable removable means, such as by threading. A valve plug 58 is affixed to or integrally formed with the valve stem 53. Once the valve stem 53 is assembled to the actuator rod 52, plug 58 is positioned within delivery valve body 24 to close port 64. As was the case with supply actuator 26, delivery actuator 28 has two positions, one where port 64 is open and the other where port 64 is closed.

Actuator 31 operates an actuator rod 57 which is connected by a valve stem to valve plug 59. Valve actuator rod 57 is located concentrically within stem 53. Valve plug 59 is adapted to fit into and close a valve seat 60 which defines a port 61 at the bottom of the housing of valve 29 so as to close a drain port 62 which is connected to drain conduit 19.

Each of the four valves of the assembly can, thus, be individually controlled. In will be apparent that when supply valve 22 is open, delivery valve body 24 is also open, and valves 23 and 29 are closed, that fluid can flow from supply tube 18 into delivery tube 20. Then, to discontinue the flow, valve 22 is closed while valve 23 remains closed for a time sufficient to allow flow of liquids remaining in the valve bodies through valve 24 into delivery tube 20. Subsequently, valve 24 is closed and valve 29 opened.

It will also be apparent that, as needed, the supply tubes can be cleaned and drained without affecting the delivery tubes, and vice-versa. For example, valves 22 and 23 could be open and valve 24 closed so that the supply side is cleaned without affecting the delivery side, or vice-versa.

The invention provides structure permitting easy removal of the actuator and valve stem from any one of the valves at any time. Using a supply valve body 22 and cleaning solution supply port valve 23 as an example, the valve plugs are both carried by a valve bonnet 70. Valve stems 33 and 37 are inserted through an opening 78 in the bonnet 70. A flow-through cage 71 is supported by each bonnet 70. The actuators 26 and 30 together with their associated valve stems, rods and plugs can thus be installed or removed as a unit. The bonnet 70 has a flange 80 which flares outward from the central opening, to fit onto a mating flange surface 82. Upon assembly the two flanges are clamped together by a suitable clamp 84. A sealing means, such as an O-ring 85 can be provided where needed in the assembly to ensure against leakage.

If one of the actuators 26 or 30 requires service, or if one of the valve plugs 40 or 39 needs replacing or other service, the clamp 84 is opened and the actuators and bonnet 70 removed. Valves 24 and 29 are constructed with a bonnet 70 similar to that described for valves 22 and 23.

Note that, in operation, port 49 can be closed by means of valve seat 39 prior to opening of ports 42 and 64. Thus, no waste of fluid occurs when the valves are in motion.

It is not unusual for the delivery tubes 16 to be smaller in size than the supply tubes 14, such as 2 inch delivery tubes being used with 3 inch supply tubes. In order to satisfy sanitary requirements, it is necessary that the total drain opening area of the manifold valve assembly 12 is at least as large as the smaller of the supply tubes 14 or the delivery tubes 16.

Referring now to the embodiment of FIG. 5, which shows a another embodiment of the invention, there is seen a configuration wherein all of the valve plugs close in the same (downward) direction.

In the embodiment of FIG. 5 the parts numbered identically to those in FIGS. 1–4 are the same. The upper valve of each pair 122 and 124 is provided with valve plugs 140 and 158 which close in a downward direction against valve seats 145 and 164, respectively. Valve 140 is actuated by actuator rod 132 and valve stem 133. Valve plug 158 is actuated by actuator rod 152 and valve stem 153. In this arrangement each bonnet 170 does not require a flow through cage member. In the arrangement of FIG. 5, each of the valve stems in the system can be fully extended and retracted for the purposes of cleaning. This assures adequate cleaning of the valve parts and associated seals in the case of situations where special problems in this regard are encountered.

A further variation of the present invention involves the addition of a side port for the purpose of installing an air blow check valve. Such valves are known in the art and are used to provide a means for blowing out of the lines and valves by means of air pressure. Such blowing may be desired in order to insure that all liquid is expelled prior to further use of the system. Such port would be provided in addition to the other ports already described herein.

It will be noted that each embodiment of the invention enables use of four simple single actuator valves, with concentric valve stems, to perform fluid flow control operations that previously required costly and complex valves. Use of these valves in accordance with the invention still prevents the mixing of different types of fluids running through the same valve assembly, even on failure of one valve seat or valve plug.

While the apparatus hereinbefore described is effectively adapted to fulfill the aforesaid objects, it is to be understood that the invention is not intended to be limited to the specific preferred embodiment of manifold valve assembly set forth above. Rather, it is to be taken as including all reasonable equivalents within the scope of the following claims.

I claim:

1. A manifold valve assembly, comprising:

a plurality of supply conduits each supplying a different fluid, a plurality of distribution conduits for distribution of said fluids to a plurality of destinations, a plurality of valve assemblies each including a pair of generally vertical valve cylinders each cylinder having an upper valve and a lower valve actuated by a pair of actuator rods that are coaxial with each other, the rods being independently actuatable by independently controlled actuators, one valve cylinder of each of said pairs having an inlet port connected to a supply conduit and the other valve cylinder of each of said pairs being connected to a distribution conduit, the valve cylinders of each pair being connected to each other by a crossover conduit near the lower ends of said cylinders, one of the bottom ports of each pair being connected to a drain, thereby forming a leak detector while the other bottom port of each pair is connected to a line supplying a cleaning fluid.

2. An assembly according to claim 1 wherein said first and second valve bodies are each formed of a valve cylinder having an upper end and a lower end, an inlet port at the upper end thereof, an outlet port on the lower end thereof aligned with said inlet port;

an actuator assembly fitted in said cylinder including: two aligned upper and lower valve actuators, a first actuator rod attached to and actuatable by the uppermost of said actuators, one end of said rod projecting outward from said actuator, a valve stem attached to the projecting end of said actuator rod, having a valve plug for opening and closing said lower outlet port, a second actuator rod attached to and actuatable by said lower actuator, said second rod being in the form of a hollow cylinder concentric and coaxial with said first actuator rod, said first and second rods being independently actuatable by said upper and lower actuators, a hollow cylindrical valve stem attached to the projecting end of said hollow actuator rod, having a valve plug for opening and closing said inlet port, said valve plug having a central opening through which said first actuator is fitted.

3. An assembly according to claim 2 wherein said first valve plug is positioned above said inlet port and is downwardly facing so that said inlet port is closed by extension of said second actuator rod.

4. A manifold valve assembly as recited in claim 1 wherein each of said valve plugs is positioned proximally relative to its valve seat, so that each valve is opened by retraction of the valve actuator rod and closed by extension thereof.

\* \* \* \* \*